(12) United States Patent
Sugimoto (10) Patent No.: US 11,458,752 B2
(45) Date of Patent: Oct. 4, 2022

(54) PRINTER

(71) Applicant: FUNAI ELECTRIC CO., LTD., Osaka (JP)

(72) Inventor: Hideki Sugimoto, Daito (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 65 days.

(21) Appl. No.: 17/052,322

(22) PCT Filed: Apr. 16, 2019

(86) PCT No.: PCT/JP2019/016289
§ 371 (c)(1),
(2) Date: Nov. 2, 2020

(87) PCT Pub. No.: WO2020/110340
PCT Pub. Date: Jun. 4, 2020

(65) Prior Publication Data
US 2021/0362526 A1    Nov. 25, 2021

Related U.S. Application Data

(60) Provisional application No. 62/773,554, filed on Nov. 30, 2018.

(51) Int. Cl.
*B41J 29/393* (2006.01)
*B41J 3/407* (2006.01)
(Continued)

(52) U.S. Cl.
CPC ......... *B41J 29/393* (2013.01); *B41J 2/04505* (2013.01); *B41J 2/2135* (2013.01);
(Continued)

(58) Field of Classification Search
CPC .... B41J 29/393; B41J 2/04505; B41J 2/2135; B41J 3/4073; B41J 3/40731; B41J 3/407;
(Continued)

(56) References Cited

U.S. PATENT DOCUMENTS 6,525,724 B1  2/2003  Takami
9,189,712 B1  11/2015  Grinberg et al.
(Continued)

FOREIGN PATENT DOCUMENTS

CN    204580251 U  *  8/2015
JP    2000-194838     7/2000
(Continued)

OTHER PUBLICATIONS

International Search Report (ISR) dated Jun. 11, 2019 in International (PCT) Application No. PCT/JP2019/016289.
(Continued)

*Primary Examiner* — Julian D Huffman
(74) *Attorney, Agent, or Firm* — Wenderoth, Lind & Ponack, L.L.P.

(57) ABSTRACT

A printer includes head that performs printing by ejecting ink at a position of ejection of the ink in a print coordinate system, camera that captures an image of an area where the ink is ejected and outputs the image in an image coordinate system, camera capturing an image of calibration pattern printed by ejecting the ink at a calibration ejection position and outputting the image including calibration pattern, the calibration ejection position being a position at which calibration pattern is printed by ejecting the ink, and calculator that calculates the amount of displacement between the position of calibration pattern in the image coordinate system and the calibration ejection position in the print coordinate system.

10 Claims, 9 Drawing Sheets

(51) Int. Cl.
*G06K 15/02* (2006.01)
*G06K 15/10* (2006.01)
*B41J 2/21* (2006.01)
*B41J 2/045* (2006.01)
*A45D 29/22* (2006.01)

(52) U.S. Cl.
CPC .......... *B41J 3/4073* (2013.01); *G06K 15/027* (2013.01); *G06K 15/102* (2013.01); *A45D 29/22* (2013.01); *B41J 3/40731* (2020.08)

(58) Field of Classification Search
CPC . B41J 11/008; G06K 15/027; H04N 1/00045; H04N 1/00087; H04N 1/32219; H04N 1/387

See application file for complete search history.

(56) References Cited

U.S. PATENT DOCUMENTS

| | | |
|---|---|---|
| 2013/0038647 A1 | 2/2013 | Hashimoto |
| 2015/0158291 A1 | 6/2015 | Suzuki et al. |
| 2016/0088197 A1 | 3/2016 | Yamasaki |
| 2017/0001451 A1 | 1/2017 | Bitoh |
| 2017/0008277 A1* | 1/2017 | Matsuda .............. B41J 2/04536 |
| 2018/0229497 A1 | 8/2018 | Darrow et al. |

FOREIGN PATENT DOCUMENTS

| | | |
|---|---|---|
| JP | 2010-89286 | 4/2010 |
| JP | 2013-34748 | 2/2013 |
| JP | 5375894 | 12/2013 |
| JP | 2015-112769 | 6/2015 |
| JP | 2016-59731 | 4/2016 |
| JP | 2017-12342 | 1/2017 |
| WO | 2017/126967 | 7/2017 |

OTHER PUBLICATIONS

Extended European Search Report dated Jul. 11, 2022 in corresponding European Patent Application No. 19888429.8, 7 pages.

* cited by examiner

PRINTER

TECHNICAL FIELD

The present invention relates to a printer using an integral head cartridge system and capable of exchanging an ink tank.

BACKGROUND ART

In recent years, there have been attempts to apply printers that eject ink to perform printing on a target object in various applications. As one example of such printers, a nail printer that manicures nails of users' fingers by printing is known (see PTL 1, for example).

CITATION LIST

Patent Literature

[PTL 1]
Japanese Unexamined Patent Application Publication No. 2000-194838

SUMMARY OF INVENTION

Technical Problem

However, conventional printers may cause an error in print position, and this remains as an issue when using the printers in applications that require accuracy in printing.

The present invention has been made in order to solve the above-described problem, and it is an object of the present invention to provide a printer that suppresses the occurrence of an error in print position.

Solution to Problem

In order to achieve the above-described object, a printer according to one aspect of the present invention is a printer for performing printing on a surface of a target object to be printed. The printer includes a head that performs printing by ejecting ink at positions of ejection of the ink in a print coordinate system, a camera that captures an image of an area where the ink is ejected and outputs the image in an image coordinate system, the camera capturing an image of a calibration pattern printed by ejecting the ink at a calibration ejection position and outputting the image including the calibration pattern, the calibration ejection position being a position at which the calibration pattern is printed by ejecting the ink, and a calculator that calculates an amount of displacement between a position of the calibration pattern in the image coordinate system and the calibration ejection position in the print coordinate system.

According to this aspect, it is possible to capture an image of an actually printed pattern by the camera and to calculate the amount of displacement of the print position on the basis of the captured image. The displacement of the print position can be reduced by a method such as a user performing correction on the basis of the calculated amount of displacement. Accordingly, it is possible to achieve a printer that suppresses the occurrence of an error in print position.

For example, the displacement between the position of the calibration pattern in the image coordinate system and the calibration ejection position in the print coordinate system may be based on a displacement between the head and the target object in a direction of ejection of the ink.

According to this aspect, the print position can be corrected based on the displacement between the head and the target object in the direction of ejection of the ink.

For example, the displacement between the position of the calibration pattern in the image coordinate system and the calibration ejection position in the print coordinate system may be based on a displacement between the head and the target object in a direction intersecting with a direction of ejection of the ink.

According to this aspect, the print position can be corrected based on the displacement between the head and the target object in the direction intersecting with the direction of ejection of the ink.

For example, the printer may further include a corrector that generates a corrected coordinate system by correcting the print coordinate system in accordance with the amount of displacement that has been calculated to reduce the amount of displacement. The head may transform the positions of ejection of the ink in the print coordinate system into positions of ejection of the ink in the corrected coordinate system and perform printing by ejecting the ink at the positions of ejection of the ink in the corrected coordinate system.

According to this aspect, by adjusting the positions of ejection of the ink in accordance with the calculated amount of displacement, it is possible to adjust the print position without additional physical adjustment. This allows automation of the adjustment of the print position. That is, it is possible to achieve a convenient-to-use printer that suppresses the occurrence of an error in print position.

For example, the corrector may generate the corrected coordinate system by projective transformation of the print coordinate system in accordance with the calibration ejection position and the calibration pattern.

According to this aspect, by using projective transformation for the correction of the print coordinate system, it is possible to adjust the print position, irrespective of the arrangement relationship between the surface to be printed and the axial direction of image capture by the camera.

For example, the target object may be calibration paper on which the calibration pattern is to be printed, the calibration paper being affixed to a surface of an adjusting jig for adjusting the displacement between the position of the calibration pattern in the image coordinate system and the calibration ejection position in the print coordinate system.

According to this aspect, the adjusting jig for adjusting the print position can be used to calculate the amount of displacement of the print position. Thus, it is possible to design the positional relationship between the axial direction of image capture by the camera and the adjusting jig, i.e., the surface to be printed, and to more accurately adjust the print position. Besides, the adjusting jig is reusable by simply renewing the calibration paper. This reduces the cost required for the adjustment of the print position.

For example, the printer may further include a mirror disposed at a position that is within an angle of view capable of being captured by the camera and that faces a plane of intersection with the surface of the adjusting jig on which the calibration pattern is to be printed, and in an orientation in which the plane of intersection is seen in a reflection plane and light from the plane of intersection is reflected off the reflection plane toward the camera.

According to this aspect, whether the calibration paper seen in the mirror is present can be determined using the image captured by the camera.

For example, the calculator may determine whether the calibration paper is present in the plane of intersection seen in the mirror captured by the camera, and when having determined the presence of the calibration paper, determine that the calibration paper is affixed to the surface of the adjusting jig.

According to this aspect, the image captured by the camera can be used to determine whether the calibration paper is present on the adjusting jig. Accordingly, the adjustment of the print position can be automated more simply by combining techniques such as image recognition.

For example, the calculator may detect a position of the adjusting jig in the direction of ejection of the ink in accordance with a boundary position between the plane of intersection and the surface of the adjusting jig on which the calibration pattern is to be printed, seen in the mirror captured by the camera.

According to this aspect, the image captured by the camera can be used to determine whether the position of the adjusting jig is appropriate. Accordingly, the adjustment of the print position can be automated more simply by combining techniques such as image recognition.

For example, the target object may be a fingernail of a human.

According to this aspect, the print position can be adjusted by actually using the nail of a human, i.e., the user. By more faithfully reproducing the conditions of use for the adjustment of the print position, the print position can be adjusted more accurately. Besides, there is no need to use other appliances such as an adjusting jig for adjusting the print position. This reduces the cost required for the adjustment of the print position.

For example, the surface of the target object to be printed may be a three-dimensional surface curved along a curved shape of the fingernail of a human, and the corrected coordinate system may be generated by further performing correction in which the three-dimensional surface is transformed into a two-dimensional surface by projective transformation.

According to this aspect, the print position can be adjusted more closely to the shape of the nail.

Note that the present invention may be implemented not only as a printer that includes such a characteristic processing unit, but also as a printer calibration method that involves processing executed by a characteristic processing unit included in a printer as steps. The present invention may also be implemented as a program for causing a computer to function as a characteristic processing unit included in a printer or a program for causing a computer to execute characteristic steps included in a printer calibration method. It goes without saying that such a program may be distributed through a non-transitory computer-readable recording medium such as a compact disc-read only memory (CD-ROM) or via a communication network such as the Internet.

Advantageous Effects of Invention

The printer according to one aspect of the present invention can suppress the occurrence of an error in print position.

DESCRIPTION OF EMBODIMENTS

Findings Forming Basis of Invention

Printers that adopt a cartridge system and are capable of exchanging an ink tank for storing printing ink are generally known. In particular, there are also printers that use an integral head cartridge system in which a print head (head) and an ink tank are integrated into one piece. By adopting the integral head cartridge system, the head can also be exchanged at the same time when the cartridge is exchanged. Thus, it is possible to reduce troubles such as ink clogging in a nozzle array for ejecting ink.

However, a mounting error with the cartridge may occur when the cartridge is exchanged. In particular, when a user mounts the cartridge, there is a higher possibility that a mounting error with the cartridge will occur. If a mounting error with the cartridge occurs in the above-described printer using an integral head cartridge system, the mounted position of the head is displaced from a proper mounted position of the head. That is, a mounting error leads to an error in print position. Therefore, a mounting error with the cartridge remains as an issue in applications that require accuracy in printing.

Hereinafter, embodiments of the present invention will be described in detail with reference to the drawings. Note that each embodiment described below illustrates a generic or specific example of the present invention. Numerical values, shapes, constituent elements, positions of constituent elements in the arrangement, a connection form of constituent elements, and so on in the following embodiments are mere examples and do not intend to limit the scope of the present invention. Among the constituent elements described in the following embodiments, those that are not recited in independent claims are described as optional constituent elements. Each drawing does not necessarily provide precise dimensions and a precise ratio of dimensions.

Each drawing is described using X-, Y-, and Z-axial directions orthogonal to one another as appropriate. In particular, an XY plane may be referred to as a horizontal plane, the plus side of the Z-axial direction may be referred to as the upper side, and the minus side of the Z-axial direction may be referred to as the lower side in the following description.

Hereinafter, a nail printer is used as one example to describe printers according to embodiments of the present invention, but the printer according to the present invention is not particularly limited to a nail printer. The present invention is applicable to any printer that may cause displacement of a head at the time of cartridge exchange.

Embodiment 1

Configuration

Figure 1:
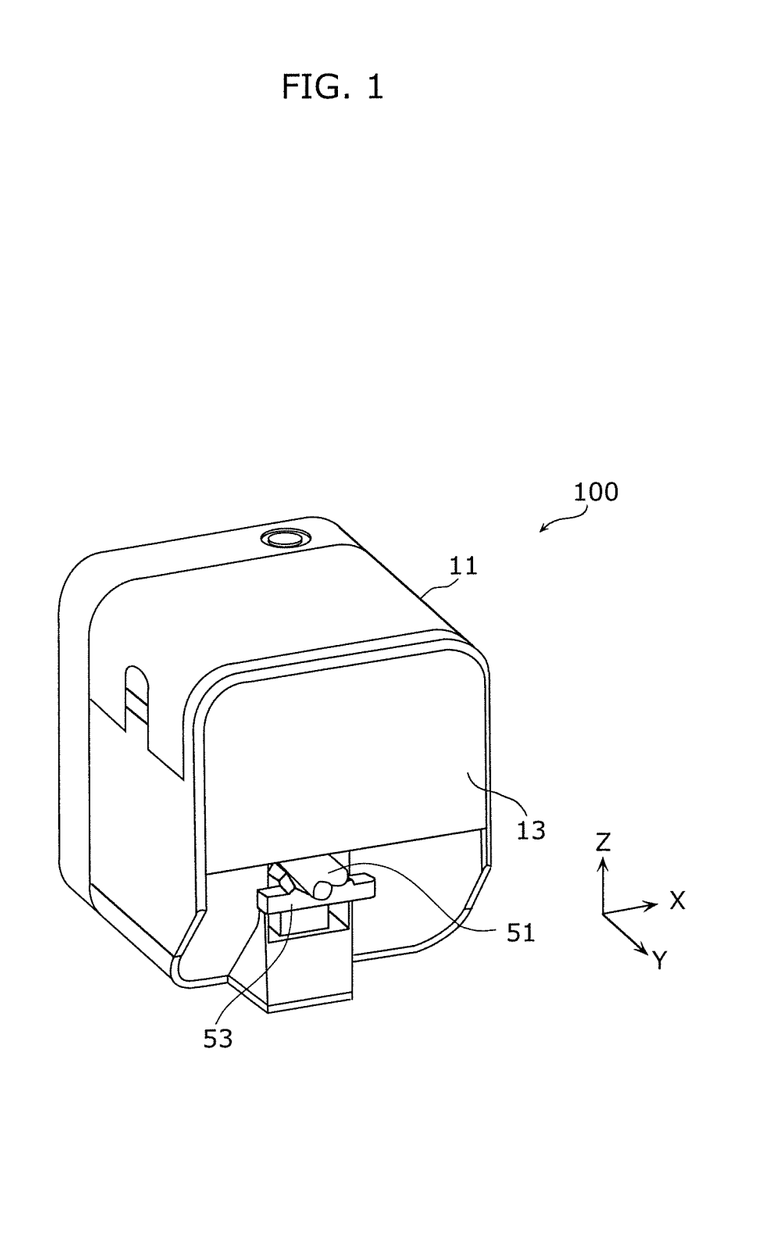
FIG. 1 is a perspective view of a nail printer according to Embodiment 1.
Figure 2:
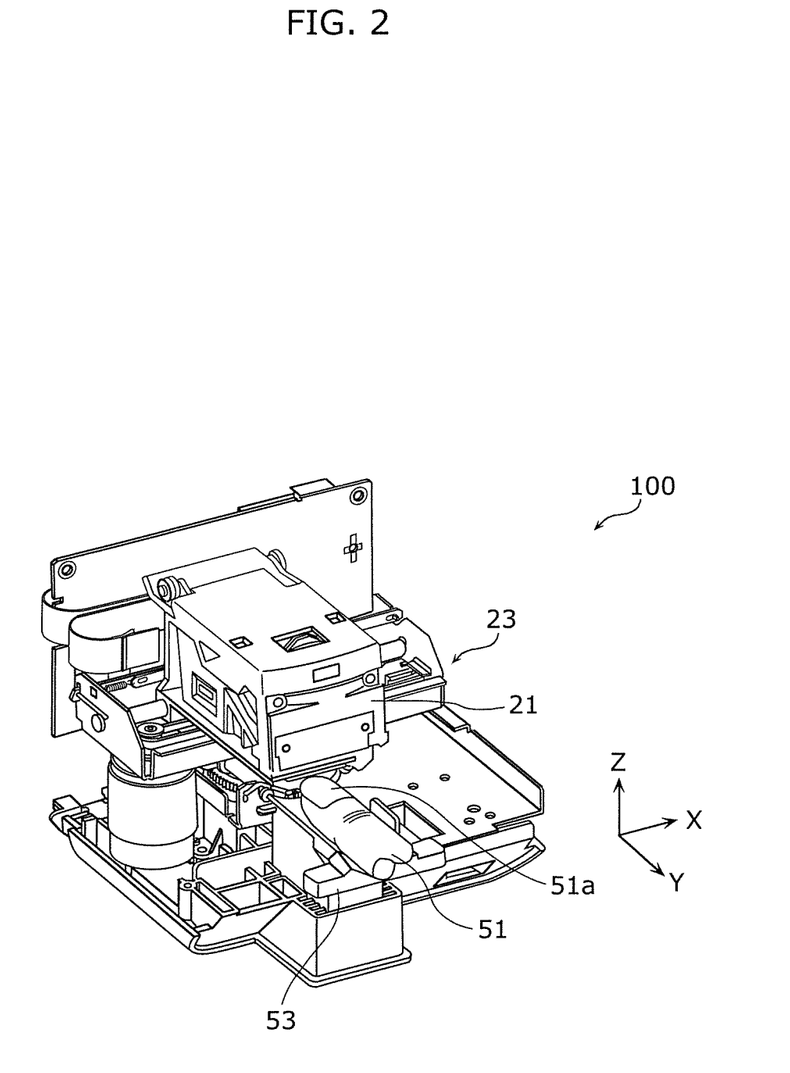
FIG. 2 is a perspective view of the nail printer according to Embodiment 1, with a cover and a front panel detached therefrom.
Figure 3:
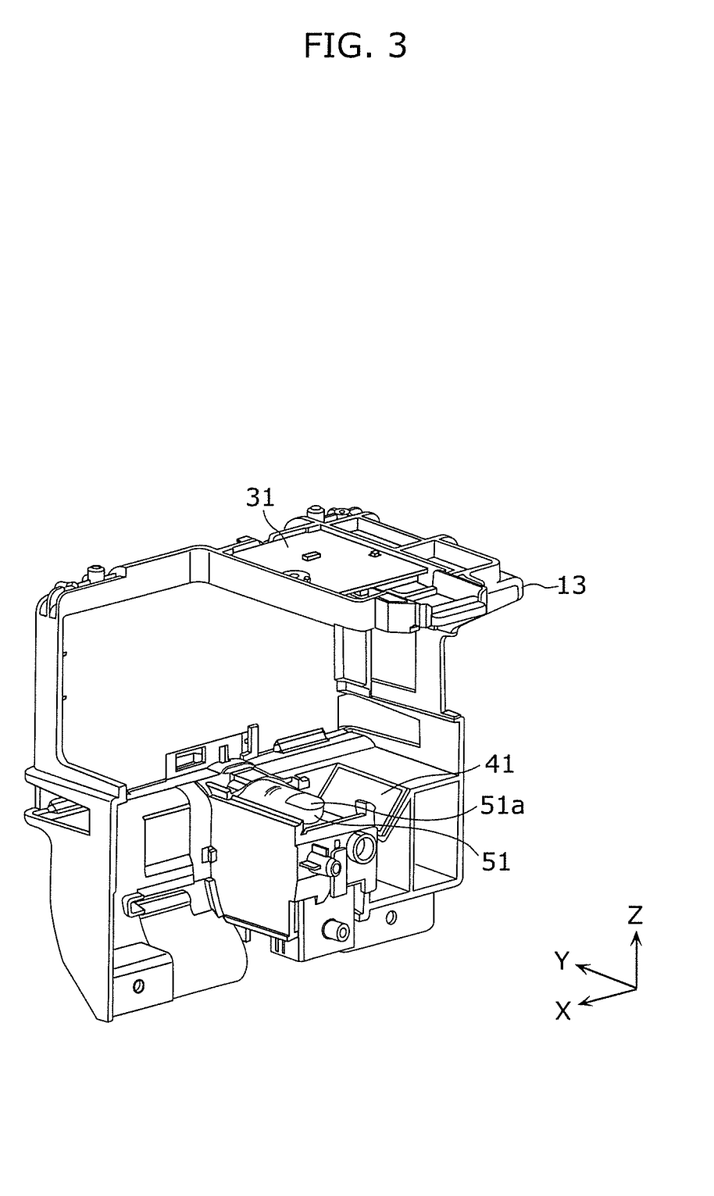
FIG. 3 is a perspective view of the front panel of the nail printer according to Embodiment 1 as viewed from the inside of a case.
Figure 4:
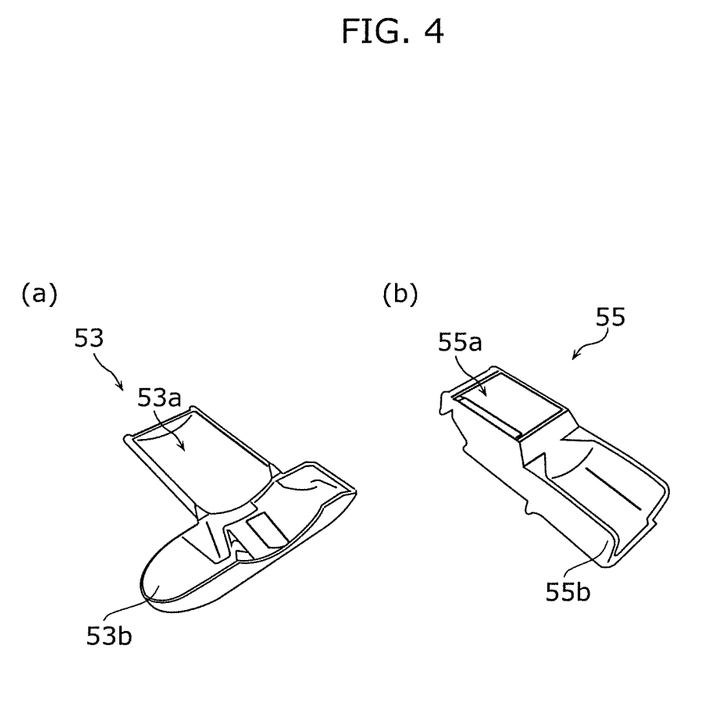
FIG. 4 is a perspective view for describing a holding jig and an adjusting jig of the nail printer according to Embodiment 1.

First, a configuration of a nail printer according to Embodiment 1 will be described with reference to FIGS. 1 to 4. FIG. 1 is a perspective view of the nail printer according to Embodiment 1. FIG. 2 is a perspective view of the nail printer according to Embodiment 1, with a cover and a front panel detached therefrom. FIG. 3 is a perspective view of the front panel of the nail printer according to Embodiment 1 as viewed from the inside of a case. FIG. 4 is a perspective view for describing a holding jig and an adjusting jig of the nail printer according to Embodiment 1.

As illustrated in FIG. 1, nail printer 100 includes a case that includes cover 11 and front panel 13, and a printing unit disposed in the case.

The case is a structure that forms the outer covering of nail printer 100 and protects constituent elements such as the printing unit disposed therein. The case also holds the constituent elements such as the printing unit disposed therein in a predetermined positional relationship. The printing unit is a print function module that implements a print function of nail printer 100.

A user of nail printer 100 inserts user's finger 51, which is a target object to be printed by nail printer 100, along holding jig 53 disposed in a predetermined location of front panel 13. Thus, nail 51a (see FIG. 2, described later) at the tip of user's finger 51 is inserted into the case. The user causes the printing unit to print a desired pattern, so that the desired pattern is printed on nail 51a of finger 51. Note that nail printer 100 is capable of, for example, wireless communication with an external terminal (not shown) such as a smartphone. The user is able to operate nail printer 100 by using an application installed in the external terminal as a user interface.

As illustrated in FIG. 2, the printing unit of nail printer 100 includes head 21 and driver 23. Head 21 receives an ejection signal indicating the positions of ink ejection in a print coordinate system from, for example, an external terminal or other device. Head 21 is a device that performs printing by ejecting ink on the basis of the positions of ejection of the ink indicated by the received ejection signal. To be more specific, head 21 includes an ink tank for storing ink and an ejector that is connected by a flow path to the ink tank and ejects the ink supplied through the flow path.

Driver 23 includes a driving mechanism and a power source for translating head 21 in an XY plane. To be more specific, as one example, the driving mechanism is implemented by a shaft that limits the translation of head 21 to one direction, a guide that holds head 21 on the shaft, and a pulley that changes the position of head 21 on the shaft. Also, as one example, the power source is implemented as a motor that drives the pulley. Note that driver 23 may also include a driving mechanism and a power source for moving head 21 in the up-down direction. As a mechanism for moving head 21, other known mechanisms may be selected arbitrarily.

Holding jig 53 defines the position of user's finger 51 inserted along holding jig 53. User's finger 51 is inserted until the tip end of finger 51 is located at the tip end of holding jig 53 (the end on the minus side of the Y-axial direction in the drawing). At this time, the user inserts finger 51, with nail 51a of finger 51 facing upward, so that the palm side of finger 51 is placed and held on holding jig 53.

Nail printer 100 uses driver 23 and causes head 21 to scan the surface of nail 51a of user's finger 51 placed on holding jig 53. At this time, nail printer 100 prints a pattern desired by the user on nail 51a by causing head 21 to eject ink.

As illustrated in FIG. 3, camera 31 is disposed in the upper portion of front panel 13 on the inner side of the case. Camera 31 captures an image of an area where ink is ejected (i.e., the tip end of holding jig 53) and outputs the image in an image coordinate system. The image captured by camera 31 is transmitted to an external terminal or other device that is connected wirelessly to the printer and used in an application that enables the user to operate nail printer 100. For example, a pattern desired to be printed by the user may be superimposed on the captured image of user's finger 51 and a resultant print image may be displayed.

Mirror 41 is also disposed at a position that is within a range capable of being captured by camera 31 of front panel 13, i.e., within the angle of view, and that is substantially the same as the position of holding jig 53 in the up-down direction (Z-axial direction). Mirror 41 has a surface facing the side part of user's finger 51 placed on holding jig 53, and is arranged in a position capable of capturing an image of this surface from camera 31. Accordingly, light emitted from the side part of user's finger 51, which faces mirror 41, is reflected by mirror 41 and enters camera 31. In other words, the side part of user's finger 51 can be seen from camera 31 over mirror 41.

The position that can be seen from camera 31 over mirror 41 varies with movement of user's finger 51 in the Z-axial direction. Thus, the position of user's finger 51 in the Z-axial direction can be detected by previously examining the correlation between the position of the target object in the Z-axial direction and the position of the target object that can be seen from camera 31 over mirror 41. That is, it is possible to detect the relative positional relationship between the position of nail 51a of user's finger 51 and a suitable position of nail 51a in the Z-axial direction for printing. Moreover, it is possible to properly output an instruction to correct the position of user's finger 51 on the basis of the detected positional relationship. The output correction instruction is, for example, transmitted to the external terminal or other device and presented to the user via the application.

In FIG. 4, (a) is a perspective view of holding jig 53 of nail printer 100 according to Embodiment 1, and (b) is a perspective view of adjusting jig 55 of nail printer 100 according to Embodiment 1.

Holding jig 53 and adjusting jig 55 illustrated in FIG. 4 are both inserted into the case and used therein.

More specifically, holding jig 53 is a part that supports user's finger 51 inserted into the case from the underside. Thus, holding jig 53 is inserted together with user's finger 51 into the case.

As illustrated in (a) of FIG. 4, upper surface 53a of an insertion portion of holding jig 53 that is inserted into the case has a curved shape depressed downward in the central portion. This shape allows holding jig 53 to support user's finger 51 inserted into the case from the underside and allows the palm side of user's finger 51 to remain in the central portion of holding jig 53. Accordingly, user's finger 51 can be easily held at a fixed position during printing of nail 51$a$. That is, the presence of holding jig 53 allows nail printer 100 to more accurately perform printing on nail 51$a$ of finger 51. Stopper 53$b$ of holding jig 53 that protrudes outward of the case is a part that has a shape extending greatly in a direction perpendicular to the direction of insertion of the insertion portion, and that suppresses excessive insertion of holding jig 53 into the case. Accordingly, the user is easily able to dispose holding jig 53 in a correct position.

Meanwhile, more specifically, adjusting jig 55 is inserted into the case and thereby forms a plane in which calibration pattern 59 (see FIG. 8, described later) is to be printed by calibration processing, which will be described later. As illustrated in (b) of FIG. 4, upper surface 55$a$ of an insertion portion of adjusting jig 55 that is inserted into the case has a planar shape substantially perpendicular to the direction of ejection of the ink from head 21 (the minus Z-axial direction). A portion of adjusting jig 55 that protrudes outward of the case has a shape that is unlike the shape of stopper 53$b$ described above and that forms knob 55$b$ having substantially the same thickness as that of the insertion portion. Even if the protruding portion has, like knob 55$b$, a shape having substantially the same thickness as that of the insertion portion, excessive insertion of adjusting jig 55 into the case can be suppressed by forming a protrusion at the boundary between the insertion portion and knob 55$b$. Besides, since knob 55$b$ does not have a greatly extending shape, unlike stopper 53$b$, adjusting jig 55 as a whole can be made compact in size.

For example, adjusting jig 55 is preferably stored in any area of the case in ordinary times because it is used in the case of using a calibration function of nail printer 100, which will be described later. By making adjusting jig 55 compact in size as described above, the storage area for adjusting jig 55 can be secured with ease. In contrast, stopper 53$b$ of holding jig 53, which has a shape extending greatly, suppresses excessive insertion of holding jig 53 into the case and provides an enough holding area for the user who handles holding jig 53. That is, stopper 53$b$ improves operability of holding jig 53.

Displacement of Head

Figure 5:
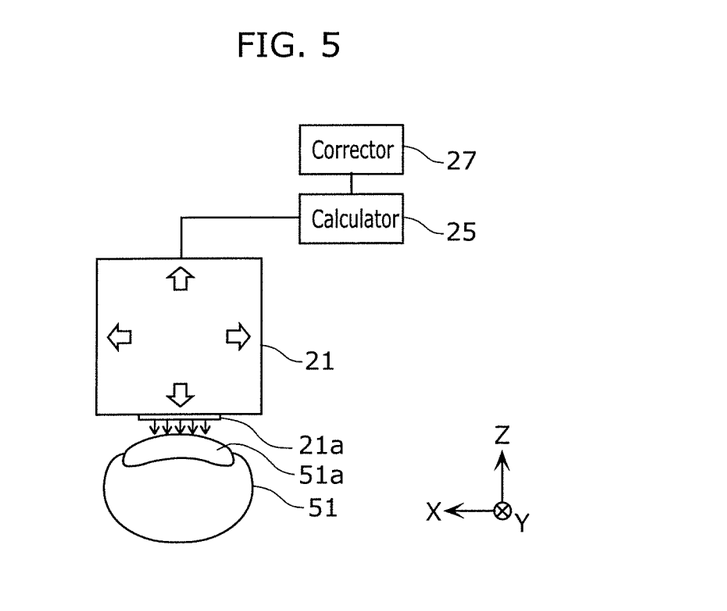
FIG. 5 is a diagram for describing the positional relationship between a head and a finger according to Embodiment 1.

Next, a description is given of head 21 in the case of printing a desired pattern on nail 51$a$ of finger 51 and the influence of the displacement of head 21 on printing, with reference to FIG. 5. FIG. 5 is a diagram for describing the positional relationship between the head and the finger according to Embodiment 1.

As illustrated in FIG. 5, user's finger 51 inserted into the case is placed on holding jig 53 (see FIG. 2), with nail 51$a$ facing in the plus Z-axial direction. Here, head 21 is moved by driver 23 to a position at which the head overlaps with nail 51$a$ in an XY plane. That is, the positions of head 21 and nail 51$a$ overlap as viewed in the Z-axial direction. To be more specific, nail 51$a$ and head 21 are in such a positional relationship that they are arranged in the order stated from the minus side of the Z-axial direction to the plus side.

With this positional relationship, ink is ejected from nozzle array 21$a$ of head 21. As indicated by arrows in the drawing, ink is ejected from the plus side of the Z-axial direction to the minus side from nozzle array 21$a$.

At the time of movement, head 21 moves in a print coordinate system that is calculated by calculator 25 and corrected by corrector 27.

For example, in the case where head 21 is displaced from nail 51$a$ in either direction indicated by a hollow arrow that points in the plus or minus X-axial direction in the drawing, ink is ejected off nail 51$a$ at the end of nail 51$a$ in the X-axial direction. Although not shown, the same also applies to the displacement in the Y-axial direction, and in this case, ink is ejected off nail 51$a$ at the end of nail 51$a$ in the Y-axial direction. Displacements of head 21 in the XY plane may occur for example in cases such as where a breakage occurs in either surface of the cartridge in the X-axial direction or the Y-axial direction at the time of mounting the cartridge.

There is also a possibility that head 21 may be displaced in either direction indicated by a hollow arrow that points in the plus or minus Z-axial direction in the drawing. Substantially, such displacements occur integrally in six directions, i.e., the plus and minus sides of each of the three-dimensional directions. The ink ejected from head 21 drops at positions that are shifted from the positions in the case where the ink drops straightforward in the Z-axial direction from the positions of ejection in the print coordinate system. Thus, if printing is performed in the presence of displacements of head 21, a pattern to be printed is shifted in the horizontal direction from the desired pattern.

Calibration Processing

Figure 6:
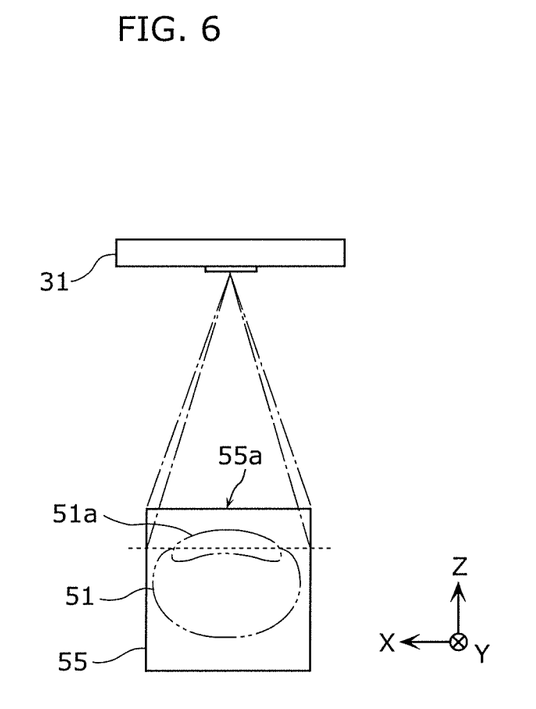
FIG. 6 is a diagram for describing the positional relationship between the adjusting jig and a nail of the finger according to Embodiment 1.

Hereinafter, calibration processing implemented by nail printer 100 according to the present embodiment will be described with reference to FIGS. 6 to 9. FIG. 6 is a diagram for describing the positional relationship between the adjusting jig and the nail of the, finger according to Embodiment 1. The positional relationship between camera 31 and adjusting jig 55 when adjusting jig 55 is inserted as a target object, viewed from the minus Y-axial direction, is illustrated in FIG. 6. Also, the position of user's finger 51 when user's finger 51 is inserted instead of adjusting jig 55 is indicated by the chain double-dashed line in FIG. 6.

In the present embodiment, calibration processing is performed that is processing for reducing the influence of the above-described displacements of head 21 on printing. The calibration processing according to the present embodiment is performed by printing calibration pattern 59 for performing calibration processing on a plane. First, the relationship between the print coordinate system used for printing calibration pattern 59 in the plane and the position of ejection of calibration pattern 59, i.e., a calibration ejection position, in the print coordinate system is calculated. Also, an image of printed calibration pattern 59 is captured, and the relationship between an image coordinate system in this image and the position of calibration pattern 59 printed in the image coordinate system is calculated.

In the calibration processing, the relationship between the print coordinate system and the calibration ejection position is compared with the relationship between the image coordinate system and the position of calibration pattern 59 so as to calculate the amount of displacement therebetween. Accordingly, nail printer 100 includes calculator 25 that performs the aforementioned calculation processing, using processing data and the image. Calculator 25 includes a circuit and a memory and performs the aforementioned calculation processing by causing the circuit to execute a program or the like stored in the memory. For example, calculator 25 may be integrated with a controller or other constituent elements for controlling the printing unit in the case in FIG. 1, or may be provided separately from the controller or other constituent elements.

As illustrated in FIG. 6, upper surface 55a of the insertion portion of adjusting jig 55 inserted into the case is located on the plus Z-axial direction side of nail 51a in the case where a typical user inserts finger 51 into the case. Accordingly, if the calibration processing is performed on upper surface 55a of adjusting jig 55, a displacement in Z-axial position occurs between the plane in which the calibration processing is performed and the plane (nail 51a) in which the user actually prints a desired pattern. In the present embodiment, such a displacement is also subjected to correction processing. The content of the correction processing will be described later.

Figure 7:
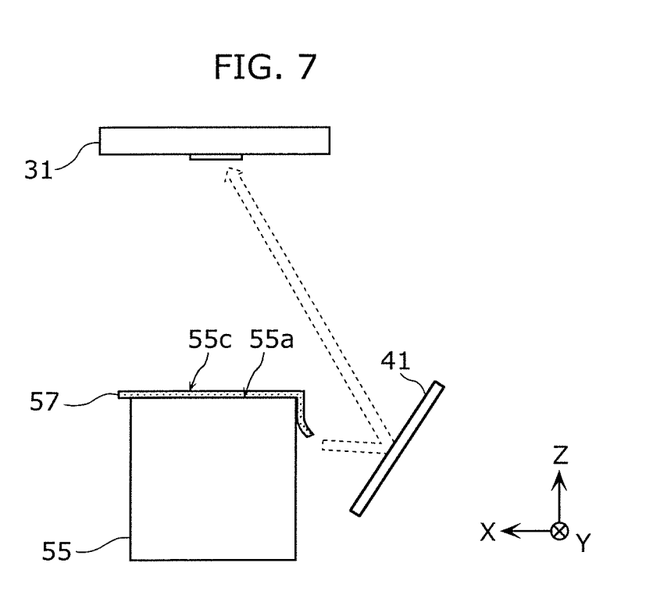
FIG. 7 is a diagram for describing calibration paper according to Embodiment 1.

FIG. 7 is a diagram for describing calibration paper according to Embodiment 1. In the calibration processing according to the present embodiment, calibration pattern 59 is printed on adjusting jig 55. However, if calibration pattern 59 is printed directly on adjusting jig 55, new adjusting jig 55 becomes necessary for each calibration processing. That is, a large number of adjusting jigs 55 is consumed, which increases the cost required for the calibration processing.

In view of this, in the present embodiment, calibration paper 57 is affixed to upper surface 55a of adjusting jig 55 as illustrated in FIG. 7, and calibration pattern 59 is printed on surface 55c of calibration paper 57. That is, in the calibration processing, printing is performed using adjusting jig 55 with calibration paper 57 affixed on upper surface 55a as a target object, instead of user's finger 51. This enables reuse of adjusting jig 55 by simply exchanging calibration paper 57 and thereby reduces the cost of the calibration processing.

Moreover, as described previously, mirror 41 is disposed such that the side part of user's finger 51 serving as a target object is seen in the surface of mirror 41 when viewed from camera 31. Therefore, in the case where adjusting jig 55 with calibration paper 57 affixed on upper surface 55a is used as a target object, instead of user's finger 51, the side part of adjusting jig 55 with calibration paper 57 affixed thereon is seen from camera 31 over mirror 41.

Here, one end of calibration paper 57 affixed to upper surface 55a of adjusting jig 55 is folded and affixed to the side part of adjusting jig 55 (the minus side of the X-axial direction in the drawing) as illustrated in FIG. 7. Therefore, whether calibration paper 57 is present on upper surface 55a of adjusting jig 55 can be determined by determining whether calibration paper 57 is present on the side part of adjusting jig 55 that can be seen from camera 31. That is, whether calibration paper 57 is affixed or not can be determined by only seeing the image captured by camera 31. This determination may be conducted automatically by image recognition.

As illustrated in FIG. 7, the area of calibration paper 57 that is affixed to upper surface 55a of adjusting jig 55 needs to have substantially flat surface 55c. On the other hand, the area of calibration paper 57 that is folded and affixed to the side part of adjusting jig 55 may be partly suspended in the air within a range that does not cause any problem in the determination by image recognition, for example.

Figure 8:
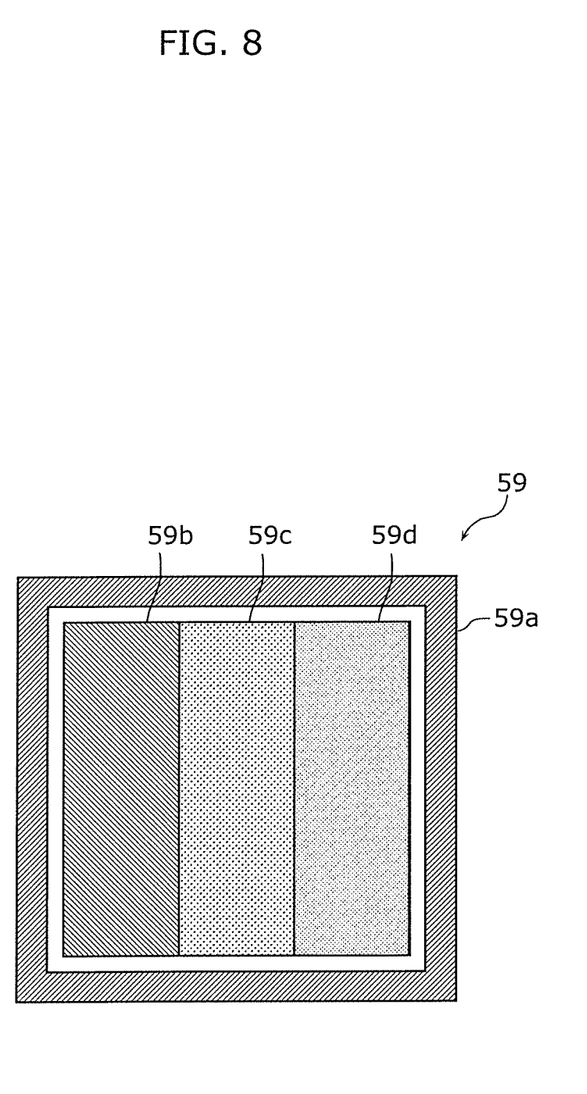
FIG. 8 is a diagram for describing a calibration pattern according to Embodiment 1.

As described above, calibration pattern 59 is printed by head 21 on calibration paper 57 that is affixed so as to form substantially flat surface 55c on upper surface 55a of adjusting jig 55. FIG. 8 is a diagram for describing the calibration pattern according to Embodiment 1.

As illustrated in FIG. 8, calibration pattern 59 according to the present embodiment includes rectangular outline 59a, first color bar 59b, second color bar 59c, and third color bar 59d. Only rectangular outline 59a of calibration pattern 59 is substantially used in the calibration processing. Thus, calibration pattern 59 does not necessarily have to include first to third color bars 59b to 59d, and may include only rectangular outline 59a. Rectangular outline 59a is also not limited to this shape, but the outline preferably has a rectangular shape similar to the sensor shape of camera 31 because it is used in image processing. For example, the outline may have a polygonal shape such as a hexagon or a decagon, or may have a circular shape.

By including first to third color bars 59b to 59d illustrated in FIG. 8, calibration pattern 59 according to the present embodiment can be used for example in the case where head 21 ejects a plurality of types of ink, to determine the presence or absence of troubles in any type of the ink.

To be more specific, in the case where head 21 ejects three types of ink, first to third color bars 59b to 59d are printed as calibration pattern 59 as illustrated in FIG. 8. First color bar 59b is an area printed solely with one of the three types of ink ejected from head 21. Second color bar 59c is an area printed solely with one of the three types of ink ejected from head 21, different from that used to print first color bar 59b. Third color bar 59d is an area printed solely with one of the three types of ink ejected from head 21, different from those used to print first color bar 59b and second color bar 59c.

In this case, if any trouble is found in a color bar when head 21 ejects a plurality of types of ink, it can be determined that there is some trouble with the ink used to print this color bar or with the process before ink ejection, such as the flow path. Accordingly, the number of color bars is not limited to three, and may be determined depending on the number of types of ink ejected from head 21.

Figure 9:
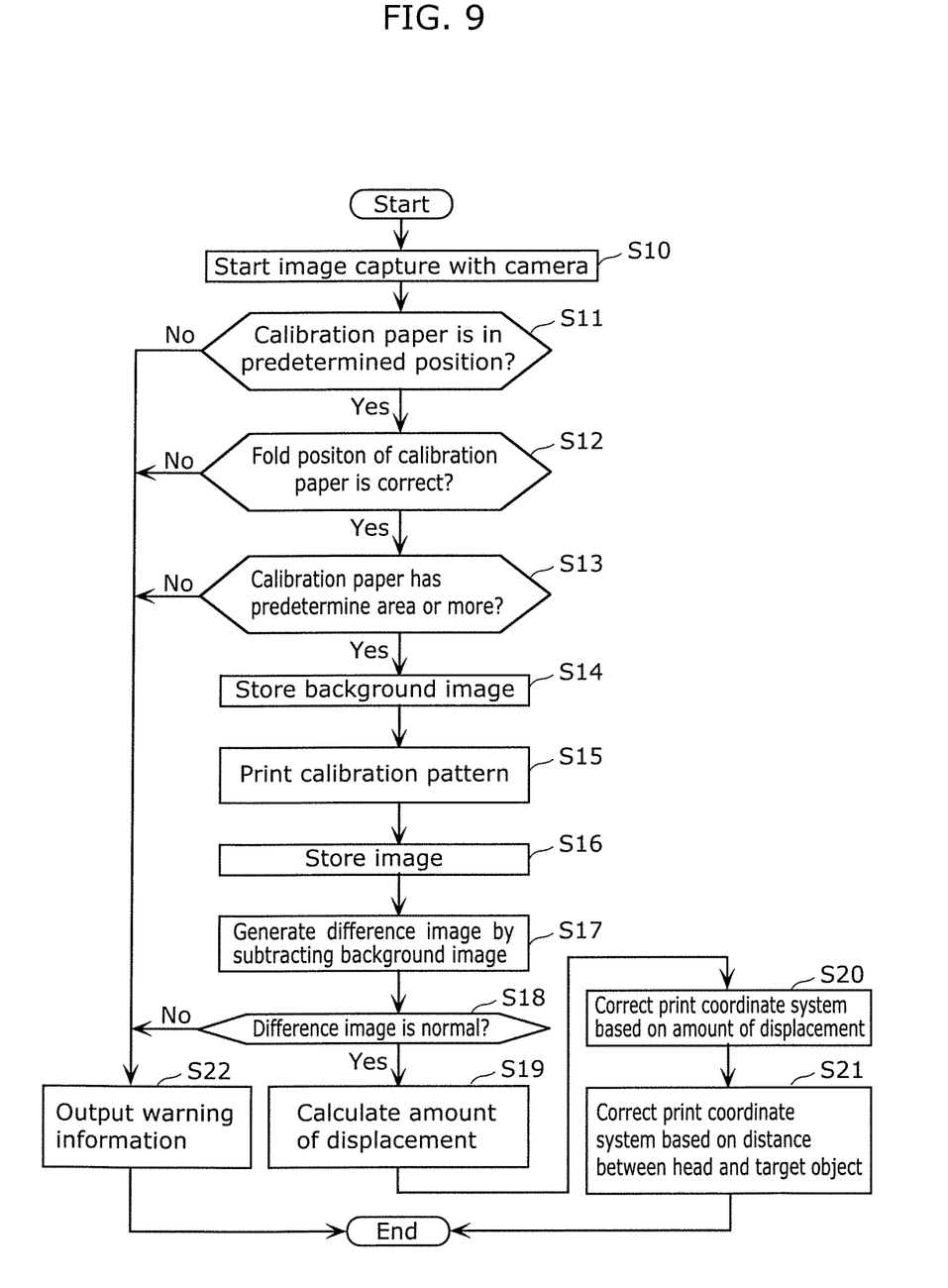
FIG. 9 is a flowchart for describing calibration processing according to Embodiment 1.

Next, a processing procedure of the calibration processing will be described with reference to FIG. 9. FIG. 9 is a flowchart for describing the calibration processing according to Embodiment 1.

The calibration processing according to the present embodiment involves presenting a recommendation to perform calibration processing to the user when nail printer 100 has determined that calibration processing is necessary. For example, nail printer 100 provides the above presentation depending on whether any operation that may cause a displacement of head 21 has been performed. More specifically, nail printer 100 provides the above presentation at the time of initial use after the user has exchanged the cartridge.

The user recognizes this presentation via the external terminal and inputs whether or not to perform calibration processing. When the user has inputted to perform calibration processing, nail printer 100 presents an instruction to insert adjusting jig 55. In accordance with the instruction, the user inserts adjusting jig 55 in a predetermined location.

Then, nail printer 100 starts image capturing (S10). The image as used herein refers to a moving image captured continuously in time sequence. Nail printer 100 determines, on the basis of the captured image, whether calibration paper 57 is affixed to upper surface 55a of adjusting jig 55 (S11).

When having determined that calibration paper 57 is not affixed (No in S11), nail printer 100 outputs a warning indication indicating that calibration was not performed (S22) and presents this indication to the user via the external terminal. At this time, nail printer 100 may further detect the position of affixation of calibration paper 57. If the position of affixation is wrong, nail printer 100 may output a warning indication indicating that calibration was not performed (S22).

On the other hand, when having determined that calibration paper 57 is affixed (Yes in S11), nail printer 100 further determines whether the position of the fold, i.e., the boundary between one end and surface 55c of calibration paper 57, is correct (S12). More specifically, nail printer 100 detects the position of adjusting jig 55 in the Z-axial direction on the basis of the position of the fold in the Z-axial direction. On the basis of whether the position of the fold is within a predetermined range in the Z-axial direction, nail printer 100 determines whether the position of adjusting jig 55 with calibration paper 57 affixed thereto is correct.

When having determined that the position of the fold of calibration paper 57 is incorrect (No in S12), nail printer 100 outputs a warning indication indicating that calibration was not performed (S22) and presents this indication to the user via the external terminal.

On the other hand, when having determined that the position of the fold of calibration paper 57 is correct (Yes in S12), nail printer 100 further determines whether the area of calibration paper 57 in the XY plane is greater than or equal to a predetermined area (S13). More specifically, nail printer 100 performs the above determination in order not to perform calibration processing when calibration paper 57 is not dedicated paper or when calibration paper 57 is not clean. Nail printer 100 binarizes the image captured by camera 31 and determines whether the area of a white portion of calibration paper 57 displayed in this image is greater than or equal to a threshold value. Note that a threshold value used in the binarization of the image and the threshold value of the area of the white portion are each set arbitrarily by, for example, the manufacturer of nail printer 100.

When having determined that the area of calibration paper 57 is less than the predetermined area (No in S13), nail printer 100 outputs a warning indication indicating that calibration was not performed (S22).

On the other hand, when having determined that the area of calibration paper 57 is greater than or equal to the predetermined area (Yes in S13), nail printer 100 stores the image captured by camera 31 as a background image (S14). Nail printer 100 also transmits an ejection signal to head 21, the ejection signal including the position at which calibration pattern 59 is printed by ejection ink, i.e., a calibration ejection position. Upon receiving the ejection signal, head 21 prints calibration pattern 59 by ejecting ink at the positions of ejection of the ink in the print coordinate system (S15).

After the printing of calibration pattern 59 has ended, nail printer 100 stores an image captured by camera 31 (S16).

Nail printer 100 subtracts luminance values in the background image stored in step S14 from the image stored in step S16. Through the above processing, nail printer 100 generates a difference image in which the background image is subtracted from the image (S17). By generating the difference image, it is possible to reduce influences such as slight contamination of calibration paper 57 that is less than or equal to the threshold value when the image is binarized in step S13.

Here, nail printer 100 determines whether the generated difference image is normal (S18). More specifically, nail printer 100 determines whether the size of calibration pattern 59 in the difference image is within a predetermined range. Then, when the size of calibration pattern 59 is greater than or smaller than the predetermined range, nail printer 100 determines that calibration pattern 59 was not captured normally. That is, when having determined that the size of calibration pattern 59 in the difference image is out of the predetermined range (No in S18), nail printer 100 outputs a warning indication indicating that calibration was not performed (S22).

On the other hand, when having determined that the size of calibration pattern 59 in the difference image is within the predetermined area (Yes in S18), nail printer 100 performs calibration using the difference image. More specifically, first, calculator 25 calculates the relationship between an image coordinate system in the difference image and the position of calibration pattern 59 in the image coordinate system. Calculator 25 also calculates the relationship between a print coordinate system and the calibration ejection position in the print coordinate system. Using the position of calibration pattern 59 in the image coordinate system and the calibration ejection position in the print coordinate system, calculator 25 calculates the direction and amount of displacement therebetween (S19).

More specifically, when there are no displacements of head 21, the calibration ejection position in the print coordinate system and the position of calibration pattern 59 in the image coordinate system match. Accordingly, the print coordinate system and the image coordinate system are in a one-to-one correspondence with each other. On the other hand, where there is a displacement of head 21, the calibration ejection position in the print coordinate system and the position of calibration pattern 59 in the image coordinate system do not match. Accordingly, the print coordinate system and the image coordinate system are not in a one-to-one correspondence with each other.

Note that the direction of displacement refers to, for example, a direction in which the calibration ejection position in the print coordinate system is displaced in a coordinate plane when the position of calibration pattern 59 in the difference image is used as a reference.

Corrector 27 corrects the print coordinate system on the basis of the calculated direction and amount of displacement (S20). More specifically, corrector 27 corrects the print coordinate system on the basis of the amount of displacement so as to reduce the amount of displacement. Corrector 27 further generates and outputs the corrected print coordinate system as a corrected coordinate system. Head 21 performs printing using the output corrected coordinate system, so that the displacement between head 21 and the target object is corrected and printing is performed more accurately. That is, it is possible to achieve a nail printer that suppresses the occurrence of an error in print position.

Figure 10:
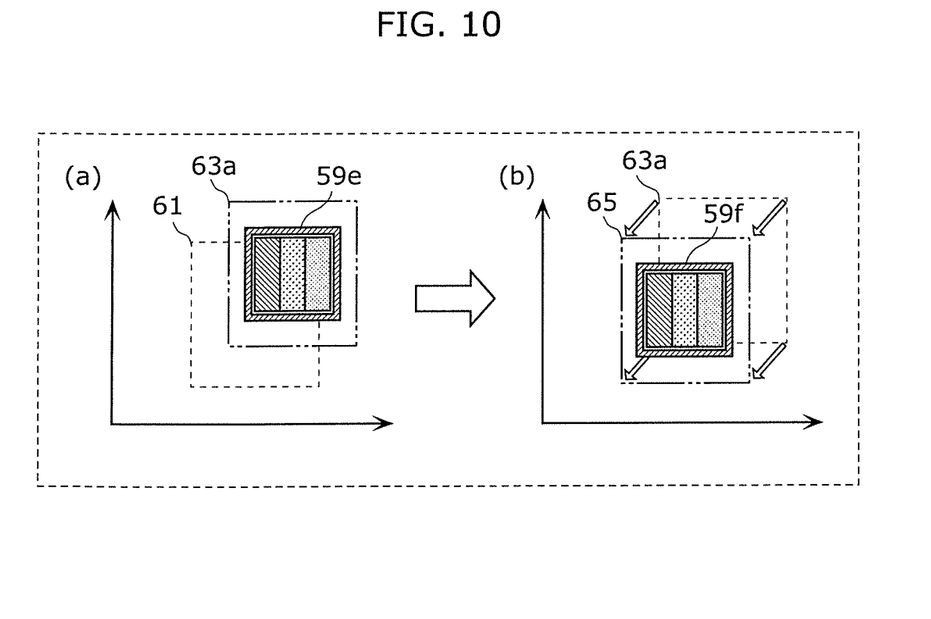
FIG. 10 is a diagram for describing correction of a print coordinate system performed by a corrector according to Embodiment 1.

The correction performed by corrector 27 will be described in more detail with reference to FIG. 10. FIG. 10 is a diagram for describing the correction of the print coordinate system performed by the corrector according to Embodiment 1.

In (a) of FIG. 10, calibration pattern 59e printed without correcting the positions of head 21 and the target object is illustrated. In (b) of FIG. 10, calibration pattern 59f printed using the corrected coordinate system generated by corrector 27 is illustrated.

Figure 11:
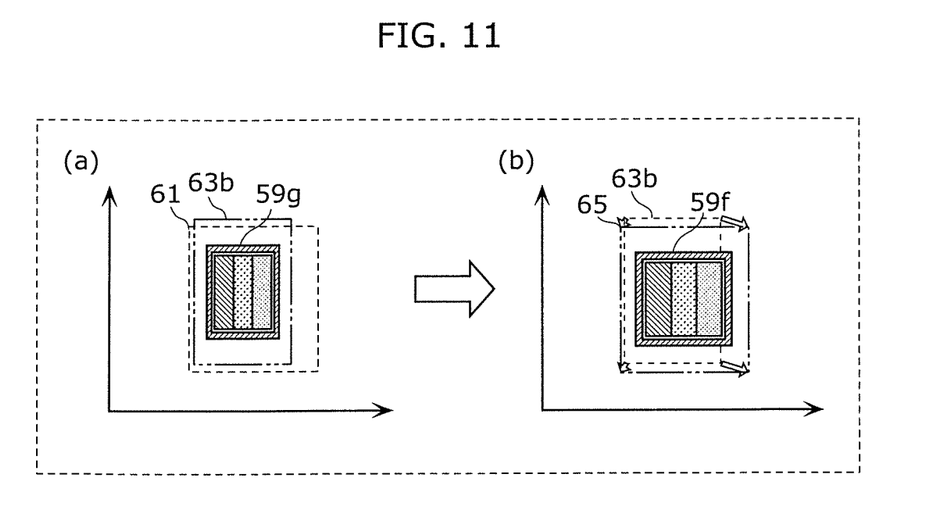
FIG. 11 is a diagram for describing correction of a print coordinate system performed by a corrector according to Embodiment 2.
Figure 12:
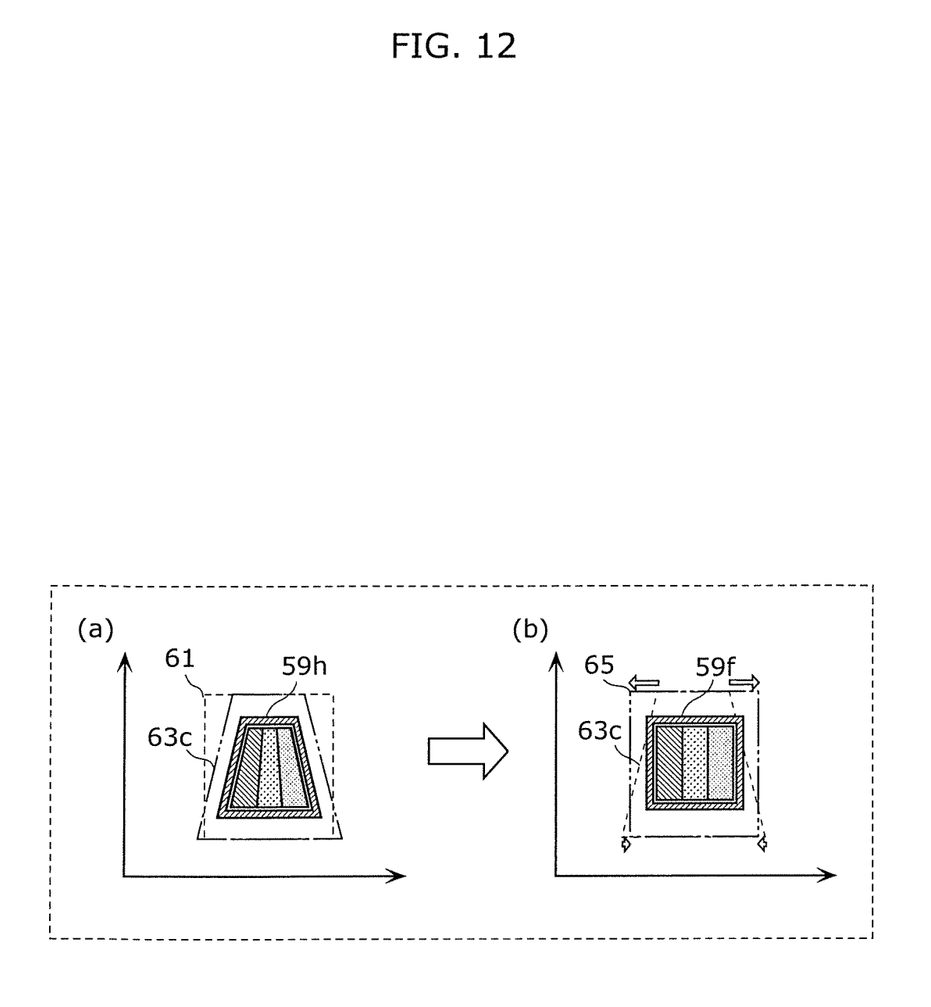
FIG. 12 is a diagram for describing correction of a print coordinate system performed by a corrector according to Embodiment 3.

In FIGS. 10 to 12, a plan view of an XY plane whose X axis is horizontally oriented in the plane of the drawing and whose Y axis is vertically oriented in the plane of the drawing. Thus, the X-axial direction may be referred to as a lateral axis direction and the Y-axial direction may be referred to as a longitudinal axis direction in the following description.

As illustrated in (a) of FIG. 10, in the present embodiment, the displacement of head 21 relative to the target object is a displacement of the XY plane in the plane direction. A print range desired to be printed so as to include calibration pattern 59f is a rectangle of target print range 61 indicated by the broken line in (a) of FIG. 10. In contrast, the print position of first print range 63a that includes actually printed calibration pattern 59e, indicated by the chain double-dashed line, is displaced from the print position of target print range 61, although being equal in shape and size to target print range 61. In view of this, as illustrated in (b) of FIG. 10, all coordinates in the print coordinate system are moved in accordance with an inverse vector (hollow arrows in the drawing) of a transfer vector pointing from target print range 61 to first print range 63a so as to generate a corrected coordinate system. Calibration pattern 59f printed in the corrected coordinate system is included in corrected print range 65 that is moved by the inverse vector from first print range 63a indicated by the broken line in the drawing.

The above-described correction involves the correction in the XY plane printed on surface 55c of calibration paper 57 affixed to adjusting jig 55, described in step S20 in FIG. 9.

Referring back to FIG. 9, corrector 27 further corrects the print coordinate system on the basis of the distance between head 21 and the target object. Note that this correction of the print coordinate system uses the corrected coordinate system output in step S20 as an input. That is, the corrected coordinate system generated in S20 is further corrected (S21).

As illustrated in FIG. 6, there is a difference between the height (position in the Z-axial direction) of upper surface 55a of adjusting jig 55 and the height (position in the Z-axial direction) indicated by the broken line in FIG. 6 where nail 51a of user's finger 51 is actually located. In FIG. 6, there is a displacement between dashed dotted lines that extend from camera 31 to the opposite ends in the X-axial direction of upper surface 55a of adjusting jig 55 and dashed dotted lines that extend from camera 31 to the opposite ends in the X-axial direction of adjusting jig 55 at the height at which nail 51a of user's finger 51 is actually located.

To be more precise, in the case where an object that has the same length as the length of adjusting jig 55 in the X-axial direction at the height at which nail 51a of user's finger 51 is actually located is placed at the height of upper surface 55a of adjusting jig 55, camera 31 obtains an image of the object that appears smaller than its actual size. Accordingly, the print coordinate system needs to be expanded in consideration of the difference between the height at which nail 51a of user's finger 51 is actually located and the height of upper surface 55a of adjusting jig 55.

The magnification at this time is determined by the ratio of the distance from camera 31 to the height at which nail 51a of user's finger 51 is actually located to the distance (length in the Z-axial direction) from camera 31 to upper surface 55a of adjusting jig 55. For example, the height at which nail 51a of user's finger 51 is actually located may be determined based on the position of nail 51a of user's finger 51 seen in mirror 41 described above.

According to the above, the corrected coordinate system is acquired that enables printing in consideration of displacements between head 21 and the target object in the XY plane and in the Z-axial direction. Accordingly, the user is able to perform printing that corrects displacements between head 21 and the target object on the basis of the corrected coordinate system, by simply giving an instruction to print a described pattern while viewing the image captured by camera 31 on the external terminal.

Note that the height at which nail 51a of user's finger 51 is actually located, illustrated in FIG. 6, is shown as being a straight line at an average height, but it may be a curve extending along the curved shape of nail 51a of user's finger 51. In other words, the surface to be printed may be a three-dimensional surface curved along nail 51a of user's finger 51. For example, calculator 25 calculates a first distance between the upper and lower ends of nail 51a of finger 51 by using the image seen in mirror 41 captured by camera 31. Calculator 25 also calculates a second distance between the opposite ends in the X-axial direction when nail 51a of finger 51 captured directly by camera 31 is viewed from above. Calculator 25 may detect a three-dimensional surface of nail 51a by using the first and second distances. That is, calculator 25 may assume nail 51a as a curved surface that smoothly connects the upper and lower ends with a length of the first distance over a length that is a half of the second distance. Calculator 25 may perform the same calculation for the Y-axial direction.

Embodiment 2

Next, Embodiment 2 according to the present invention will be described with reference to FIG. 11. FIG. 11 is a diagram for describing correction of the print coordinate system by a corrector according to Embodiment 2. Embodiment 1 above has described an example in which calibration pattern 59 is printed as calibration pattern 59e that is equal in shape and size. In contrast, the present embodiment describes an example of printing calibration pattern 59g obtained by altering the shape and size of calibration pattern 59.

In (a) of FIG. 11, calibration pattern 59g printed without correcting the positions of head 21 and the target object is illustrated. In (b) of FIG. 11, calibration pattern 59f printed using a corrected coordinate system generated by corrector 27 is illustrated.

In the present embodiment, as illustrated in (a) of FIG. 11, calibration pattern 59g printed without correcting the positions of head 21 and the target object has a rectangular shape that is reduced in size in the lateral axis direction and that is long in the longitudinal axis direction. Second print range 63b that includes calibration pattern 59g, indicated by the chain double-dashed line in the drawing, also has a shape obtained by deforming target print range 61 with a similar aspect ratio.

This deformation occurs, for example, in cases such as where head 21 is inclined upward in a height direction from the minus side of the lateral axis direction to the plus side with respect to the target object. In the above-described case, corrector 27 is capable of generating a corrected coordinate system by expanding the print coordinate system in the lateral axis direction.

For example, second print range 63b is expanded in the lateral axis direction by an amount corresponding to the ratio of the length of calibration pattern 59f in the lateral axis direction to the length of calibration pattern 59g. Moreover, since in the present embodiment, there is also a displacement in the XY plane as in Embodiment 1, similar correction to that in Embodiment 1 is performed at the same time. That is, Embodiments 2 and 1 may be combined. Accordingly, second print range 63b is expanded in the lateral axis direction and translated into corrected print range 65 in the minus longitudinal axis direction and in the minus lateral axis direction, as indicated by hollow arrows in (b) of FIG. 11.

The above-described correction involves a step that corresponds to the correction in the XY plane printed on surface 55c of calibration paper 57 affixed to adjusting jig 55, described in step S20 in FIG. 9 according to Embodiment 1.

Embodiment 3

Next, Embodiment 3 according to the present invention will be described with reference to FIG. 12. FIG. 12 is a diagram for describing correction of the print coordinate system performed by a corrector according to Embodiment 3. Embodiment 1 above has described an example in which calibration pattern 59 is printed as calibration pattern 59e that is equal in shape and size. In contrast, the present embodiment describes an example of printing calibration pattern 59h that has a trapezoidal shape.

In (a) of FIG. 12, calibration pattern 59h printed without correcting the positions of head 21 and the target object is illustrated. In (b) of FIG. 12, calibration pattern 59f printed using a corrected coordinate system generated by corrector 27 is illustrated.

In the present embodiment, as illustrated in (a) of FIG. 12, calibration pattern 59h printed without correcting the positions of head 21 and the target object has a trapezoidal shape that is reduced in size in the lateral axis direction on the plus side of the longitudinal axis direction and that is increased in size in the lateral axis direction on the minus side of the longitudinal axis direction. Third print range 63c that includes calibration pattern 59h, indicated by the chain double-dashed line in the drawing, also has a shape obtained by deforming target print range 61 with a similar aspect ratio.

This deformation occurs, for example, in cases such as where camera 31 is inclined upward in a height direction from the minus side of the longitudinal axis direction to the plus side with respect to the target object. In the above-described case, corrector 27 is capable of generating a corrected coordinate system by projective transformation.

For example, third print range 63c is deformed such that calibration pattern 59f is formed by projective transformation of calibration pattern 59h. Since in the present embodiment, there is also a displacement in the XY plane as in Embodiment 1, similar correction to that in Embodiment 1 is performed at the same time. That is, Embodiments 3 and 1 may be combined. Accordingly, each vertex of third print range 63c is expanded or reduced and is translated into corrected print range 65 in the minus longitudinal axis direction and in the minus lateral axis direction, as indicated by hollow arrows in (b) of FIG. 12.

The above-described correction involves a step that corresponds to the correction in the XY plane printed on surface 55c of calibration paper 57 affixed to adjusting jig 55, described in step S20 in FIG. 9 according to Embodiment 1.

While the printers according to embodiments of the present invention have been described thus far, the present invention is not intended to be limited to these embodiments.

For example, the printer may align the insertion location of adjusting jig 55 on the basis of the amount of displacement calculated by the calculator.

Alternatively, for example, the printer may output information indicating the alignment of the insertion location of adjusting jig 55. The user may simply output an instruction to adjust the jig in accordance with alignment instruction information that is presented based on the above output on the external terminal.

While configurations using a calibration pattern have been described, it is not an absolute necessity to use a calibration pattern. Even in the case of using a pattern desired by the user, similar calibration processing can be implemented by image recognition.

A case has been described in which whether calibration paper is present is determined depending on whether one end of calibration paper is present on the side part of the adjusting jig seen in the mirror captured by the camera, similar determination may be performed depending on, for example, whether calibration paper seen directly by the camera is present. As an alternative, for example, in the case of a configuration in which the calibration paper has a prescribed size and an image of the calibration paper can be captured within a fixed angle of view, it is possible to detect a displacement of the adjusting jig in the up-down direction on the basis of the size of the calibration pattern in the captured image. A printer that includes no mirror may be implemented by combining the above-described techniques.

The present invention may be applied to, for example, any conceivable printer other than nail printers.

Specifically, each device described above may be configured as a computer system that includes, for example, a microprocessor, a ROM, a RAM, a hard disk drive, a display unit, a keyboard, and a mouse. The RAM or the hard disk drive stores computer programs. The function of each device may be implemented by the microprocessor operating in accordance with the computer programs. Here, the computer programs may be configured by combining a plurality of instruction codes, each indicating a command given to the computer, in order to achieve predetermined functions.

Alternatively, some or all constituent elements of each device described above may be configured as a single system large scale integrated circuit (LSI). The system LSI is an ultra-multifunctional LSI manufactured by integrating a plurality of components on a single chip and, for example, includes a computer system configured to include, for example, a microprocessor, a ROM, and a RAM. In this case, the ROM stores computer programs. The functions of the system LSI can be implemented by the microprocessor operating in accordance with the computer programs.

As another alternative, some or all constituent elements of each device described above may be configured as an IC card or a united module, which is detachable from the device. The IC card or the module may be a computer system that includes, for example, a microprocessor, a ROM, and a RAM. The IC card or the module may include the above-described ultra-multifunctional LSI. The functions of the IC card or the module are implemented by the microprocessor operating in accordance with the computer programs. The IC card or the module may have protection against tampering.

The present invention may be implemented as the methods described above. The present invention may also be implemented as a computer program that realizes these methods by a computer, or as a digital signal generated by the above-described computer programs.

The present invention may also be implemented by recording the above-described computer programs or digital signal in a non-transitory computer-readable recording medium such as a flexible disk, a hard disk, a CD-ROM, an MO, a DVD, a DVD-ROM, a DVD-RAM, a Blu-ray (registered trademark) disc, or a semiconductor memory. The present invention may also be implemented as the above-described digital signal recorded in such a non-transitory recording medium.

The present invention may be implemented by transmitting the above-described computer programs or digital signal via, for example, telecommunication lines, wireless or wired communication lines, networks typified by the Internet, or data communications.

The present invention may also be implemented as a computer system that includes a microprocessor and a memory and in which the memory stores the above-described computer programs and the aforementioned microprocessor operates in accordance with the above-described computer programs.

The present invention may also be implemented as another independent computer system by transferring the above-described programs or digital signal recorded in the above-described non-transitory recording medium or by transferring the above-described programs or digital signal via, for example, the above-described network.

The embodiments described above may be combined in any way.

INDUSTRIAL APPLICABILITY

The present invention is applicable to, for example, a nail printer for performing printing on a fingernail.

REFERENCE SIGNS LIST 11 cover
13 front panel
21 head
21a nozzle array
23 driver
25 calculator
27 corrector
31 camera
41 mirror
51 finger
51a nail
53 holding jig
53a, 55a upper surface
53b stopper
55 adjusting jig
55b knob
55c surface
57 calibration paper
59, 59e, 59f, 59g, 59h calibration pattern
59a rectangular outline
59b first color bar
59c second color bar
59d third color bar
61 target print range
63a, 63b, 63c print range
65 corrected print range
100 nail printer

The invention claimed is:

1. A printer for performing printing on a surface of a target object to be printed, the printer comprising:
a head that performs printing by ejecting ink at positions of ejection of the ink in a print coordinate system;
a camera that captures an image of an area where the ink is ejected and outputs the image in an image coordinate system, the camera capturing an image of a calibration pattern printed by ejecting the ink at a calibration ejection position and outputting the image including the calibration pattern, the calibration ejection position being a position at which the calibration pattern is printed by ejecting the ink;
a calculator that calculates an amount of displacement between a position of the calibration pattern in the image coordinate system and the calibration ejection position in the print coordinate system; and
a corrector that generates a corrected coordinate system by correcting the print coordinate system in accordance with the amount of displacement that has been calculated to reduce the amount of displacement,
wherein the head transforms the positions of ejection of the ink in the print coordinate system into positions of ejection of the ink in the corrected coordinate system and performs printing by ejecting the ink at the positions of ejection of the ink in the corrected coordinate system.

2. The printer according to claim 1,
wherein the displacement between the position of the calibration pattern in the image coordinate system and the calibration ejection position in the print coordinate system is based on a displacement between the head and the target object in a direction of ejection of the ink.

3. The printer according to claim 1,
wherein the displacement between the position of the calibration pattern in the image coordinate system and the calibration ejection position in the print coordinate system is based on a displacement between the head and the target object in a direction intersecting with a direction of ejection of the ink.

4. The printer according to claim 1,
wherein the corrector generates the corrected coordinate system by projective transformation of the print coordinate system in accordance with the calibration ejection position and the calibration pattern.

5. The printer according to claim 4,
wherein the target object is a fingernail of a human,
the surface of the target object to be printed is a three-dimensional surface curved along a curved shape of the fingernail of a human, and
the corrected coordinate system is generated by further performing correction in which the three-dimensional surface is transformed into a two-dimensional surface by projective transformation.

6. The printer according to claim 1,
wherein the target object is calibration paper on which the calibration pattern is to be printed, the calibration paper being affixed to a surface of an adjusting jig for adjusting the displacement between the position of the calibration pattern in the image coordinate system and the calibration ejection position in the print coordinate system.

7. The printer according to claim 6, further comprising:
a mirror disposed at a position that is within an angle of view capable of being captured by the camera and that faces a plane of intersection with the surface of the adjusting jig on which the calibration pattern is to be printed, and in an orientation in which the plane of intersection is seen in a reflection plane and light from the plane of intersection is reflected off the reflection plane toward the camera.

8. The printer according to claim 7,
wherein the calculator determines whether the calibration paper is present in the plane of intersection seen in the mirror captured by the camera, and when having determined the presence of the calibration paper, determines that the calibration paper is affixed to the surface of the adjusting jig.

9. The printer according to claim 7,
wherein the calculator detects a position of the adjusting jig in the direction of ejection of the ink in accordance with a boundary position between the plane of intersection and the surface of the adjusting jig on which the calibration pattern is to be printed, seen in the mirror captured by the camera.

10. The printer according to claim 1,
wherein the target object is a fingernail of a human.

* * * * *